(12) United States Patent
Palazzo et al.

(10) Patent No.: US 12,058,221 B2
(45) Date of Patent: Aug. 6, 2024

(54) COLLECTION OF MEANINGFUL EVENT DATA FOR PRESENTATION

(71) Applicant: AT&T Intellectual Property I, L.P., Atlanta, GA (US)

(72) Inventors: Richard Palazzo, Stewartsville, NJ (US); Brian M. Novack, St. Louis, MO (US); Rashmi Palamadai, Naperville, IL (US); Tan Xu, Bridgewater, NJ (US); Eric Zavesky, Austin, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 316 days.

(21) Appl. No.: 17/541,010

(22) Filed: Dec. 2, 2021

(65) Prior Publication Data

US 2023/0179673 A1  Jun. 8, 2023

(51) Int. Cl.
*H04L 67/50* (2022.01)
*H04W 4/21* (2018.01)
*H04W 4/38* (2018.01)

(52) U.S. Cl.
CPC ............. *H04L 67/535* (2022.05); *H04W 4/21* (2018.02); *H04W 4/38* (2018.02)

(58) Field of Classification Search
None
See application file for complete search history.

(56) References Cited

U.S. PATENT DOCUMENTS

| | | | |
|---|---|---|---|
| 9,742,903 B1* | 8/2017 | Ferdman | H04L 67/535 |
| 10,482,449 B1* | 11/2019 | Gantert | G06Q 20/3274 |
| 2021/0398196 A1* | 12/2021 | De Troyer | G06Q 20/3276 |
| 2022/0156716 A1* | 5/2022 | Saniger | G06Q 20/326 |
| 2023/0018985 A1* | 1/2023 | Hardy | H04N 21/41407 |
| 2023/0114350 A1* | 4/2023 | Vahidi | G06Q 20/4014 |
| | | | 705/44 |

* cited by examiner

*Primary Examiner* — Kenneth B Wells

(57) ABSTRACT

The disclosed technology is directed towards determining that information of interest, corresponding to as a meaningful event, is available to be captured and saved, and capturing the information. When an event is determined to satisfy a defined meaningful event likelihood criterion, sensor data (which can include media data), time data and location data are collected and associated with the meaningful event, e.g., in a data store. A presentation/package is generated from the various data, and maintained for subsequent access, e.g., for sending to a recipient. The presentation can include annotation data. The presentation can be conditionally marked for future presentation if and when certain condition data is satisfied. The presentation can be associated with at least one conditional gift.

20 Claims, 10 Drawing Sheets

| Meaningful Event | Date/Time Stamp | Collected Sensor Data and Metadata | Collected Media (Sensor Data) | User Annotation | Conditional Presentation of Event | Conditional Gift |
|---|---|---|---|---|---|---|
| Walking to beach concert with Susie | 02AUG2022 06:45PM-07:02PM | Location, temperature, etc. | Videos, audios, etc. | "I'm feeling so happy to be able to share this with you, Susie." | Send Meaningful Event to Susie on her 18th birthday<br><br>Send Meaningful Event to Susie if she is within 10 miles of this location<br><br>Send Meaningful Event to me in 20 years<br><br>Send Meaningful Event to me next time I visit my parents | Buy next meal for Susie if she is near location and without user |

Meaningful Event Content — 332

COLLECTION OF MEANINGFUL EVENT DATA FOR PRESENTATION

TECHNICAL FIELD

The subject application relates to the capture of information in general, and more particularly to capturing information related to events that are meaningful to a user, for future presentation of the information.

BACKGROUND

Contemporary users of media are often equipped with smart devices such as smartphones, smart watches, or other wearables. A smart device may have sensors such as a camera, a microphone and for location detection capabilities. Various other sensors, such as biometric sensors (sensing the wearer's heart rate, temperature and other data) are often controlled by or coupled to a user. Also, there are other external sensors not directly controlled by or coupled to the user, such as environmental sensors for sensing humidity, temperature, and the like.

Despite the availability of these various data, there are few records of meaningful events that a user can access. Planned events such as weddings, reunions, and important birthdays have records in the form of photographs and videos, but for most people these meaningful events are exceptions.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
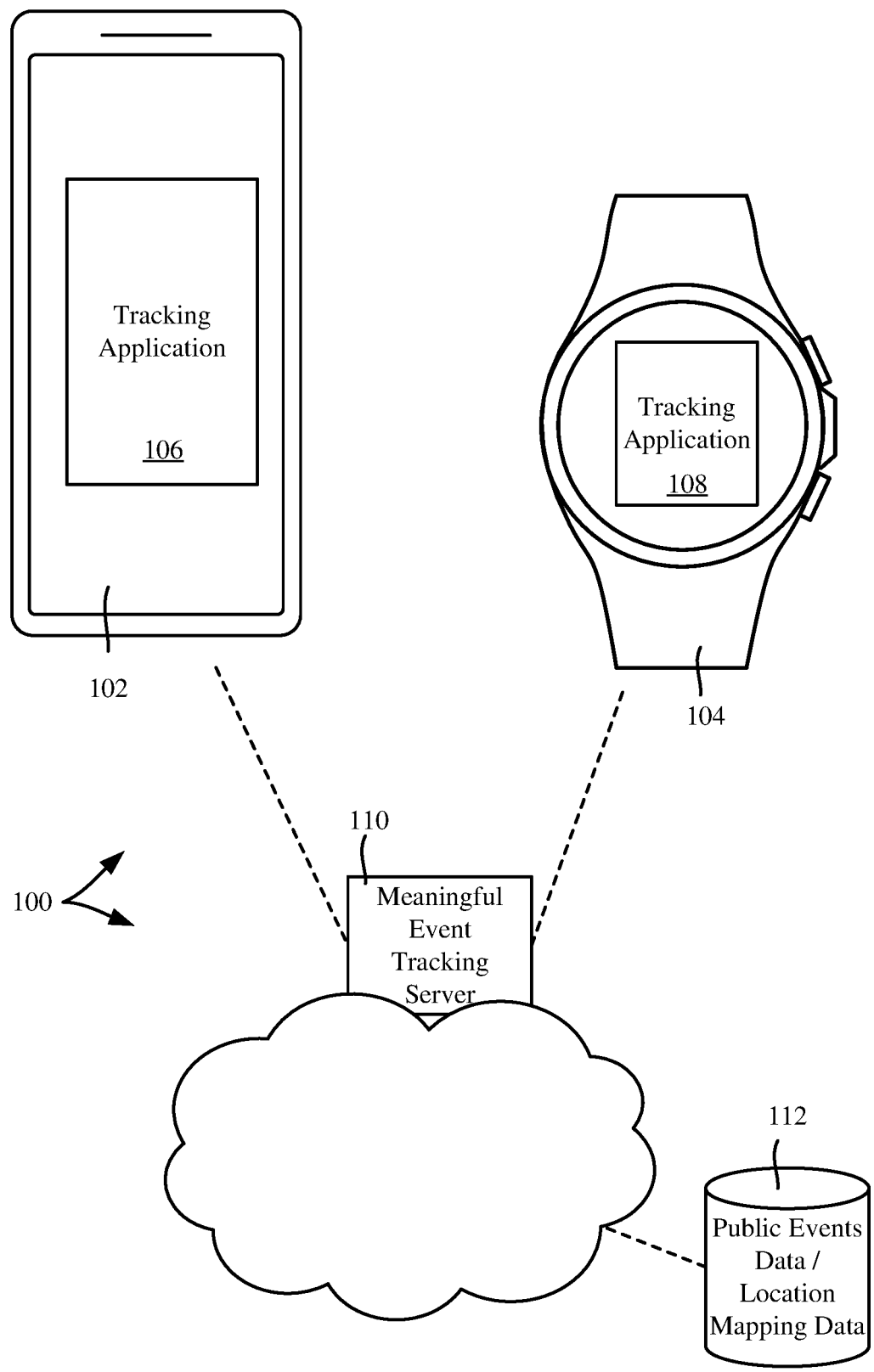
FIG. 1 is a block diagram illustrating an example system configured to identify meaningful events, in accordance with various aspects and embodiments of the subject disclosure.

The technology described herein is generally directed towards analyzing various data and applying logic to the data to make a determination as to whether a person is experiencing a meaningful life event, and if so, to collect a recording of sensor data related to the meaningful life event. For example, a person with a device such as a smartphone, smart watch, and/or other wearable technology can obtain a large amount of data from various sensors of those devices. The data can be evaluated by a tracking application program, such as running in the smartphone, in the cloud or a combination of both to determine whether to trigger the data collection. Note that sensor data can include media content such as a video feed captured via a camera (sensor), an audio feed captured by a microphone (sensor), as well as sensor data from other types of sensors such as wearable devices, a nearby thermometer that senses ambient temperature proximate the user's location and so forth. Further, sensor data can comprise captured media content from other sources such as a traffic camera near the user.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a block diagram/dataflow example of a system 100 in which a device such as a smartphone, smart watch, or other wearable technology is operated by or coupled to a user. In FIG. 1 a smartphone 102 and smart watch 104 are shown as non-limiting examples. One or both of the devices 102 and 104 may be equipped with location capabilities, a camera, a microphone, and various sensors, such as biometric sensors (sensing heart rate and other data). Humidity, temperature, and other environmental sensors may collect additional data, such as directly to an extent, or obtained from other sensors based on the user's current location at a given time; e.g., a weather application program can obtain the current temperature, wind speed and direction, humidity, air quality and other environmental data that can be evaluated.

In the example of FIG. 1, the device 102 is shown as having an instance of a tracking application program 106 that collects data from these sensors and from other sources, for instance, over the Internet. The device 104 is shown as having a similar instance of a tracking application program 108. The two example programs 106 and 108 can be associated with the same user, or can be associated with different users; e.g., a daughter can be carrying her cell phone device 102 and her father can be wearing the device 104. The devices 102 and 104/the programs 106 and 108 can communicate with each other directly over near field communication or more indirectly over the internet or a cellular connection.

A tracking application program (e.g., 106) may continuously collect and process data using various logic to make a determination as to whether the person is experiencing a meaningful life event. For example, a sudden acceleration in a wearer's heart rate that is not accompanied by a sensing of physical exercise may be predicted to indicate a level of excitement, which may be associated with a meaningful event to trigger additional data collection, e.g., via a camera and microphone. In addition to (or instead of) any data processing and analyzing performed by the tracking application program 106, the data processing and analyzing can be performed, at least in part, by a meaningful event tracking server 110.

Figure 2:
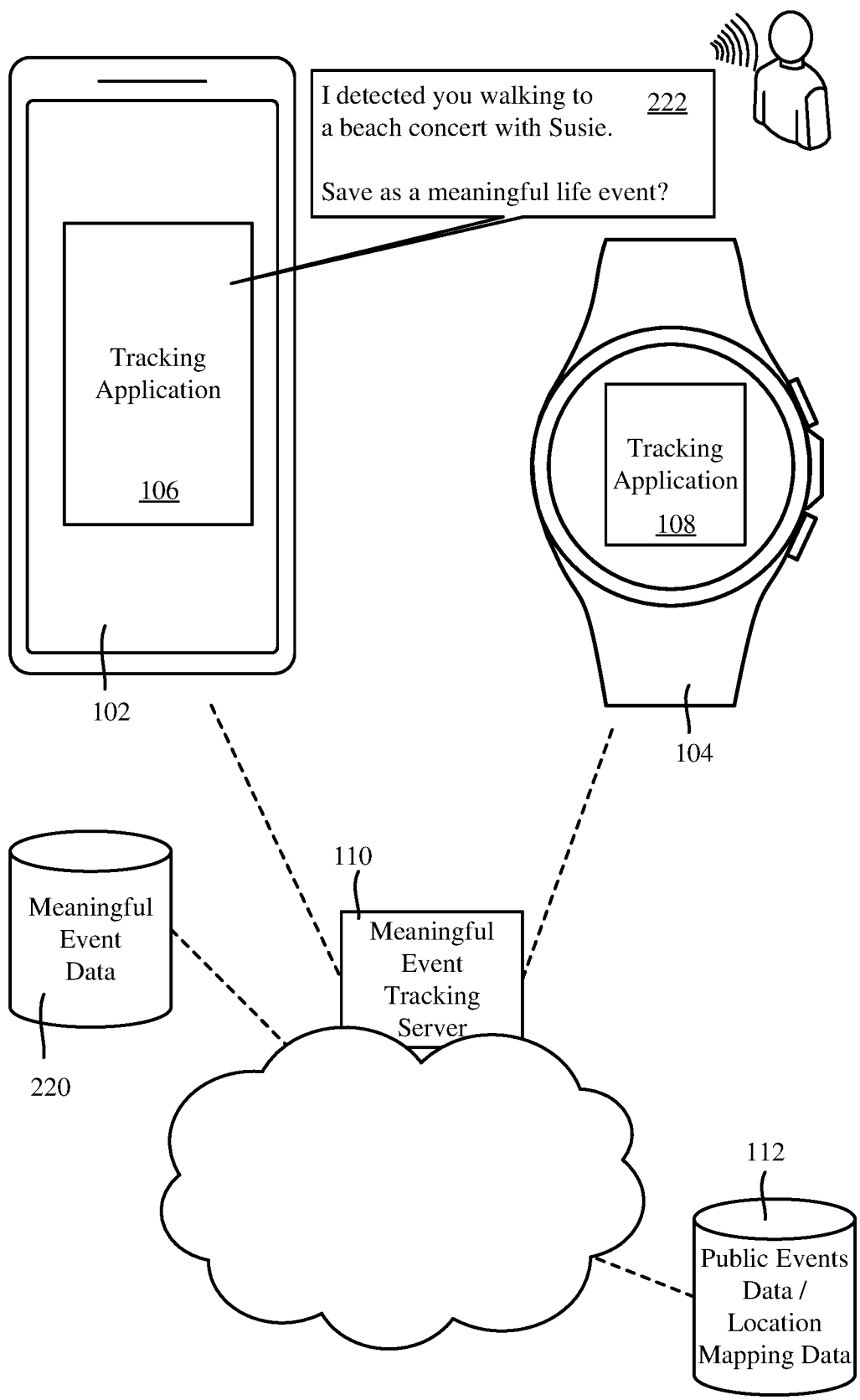
FIG. 2 is a block diagram illustrating an example system configured to identify meaningful events and save meaningful event data, in accordance with various aspects and embodiments of the subject disclosure.

As depicted in FIGS. 1 and 2, the meaningful event tracking server 110 can be an edge computing device, a cloud computing device or some combination of both. The meaningful event tracking server 110 can assist the user in meaningful event data storage (block 220 of FIG. 2) of the sensor data and/or other collected sensor data, such as to store large video data uploaded by the tracking application program 106 to the meaningful event tracking server 110.

A number of different types of data may be used to identify the likelihood of a meaningful life event based on the event satisfying a defined meaningful event likelihood criterion. For example, the presence of another person can be sensed by a device via a near-field communications from nearby friends or family who have a similar device and have allowed their presence to be identified. Other technologies such as facial or voice recognition can detect the presence of relevant others.

The location of the device may be mapped to a place of significance, such as a vacation spot, a concert venue, a relative's home, or other likely meaningful place, using location mapping data maintained in a suitable data store (block 112). The microphone may record dialogue that may be processed by the tracking application program 106 to recognize speech and identify topics of conversation, mood, and other indications of meaningful discussion.

Public data (block 112) may be accessed to identify events that are occurring nearby, such as an advertised event. The person's electronic calendar may be accessed to identify potentially meaningful events via artificial intelligence techniques or keyword matching.

By way of a more specific example, consider that a person's tracking application program 106 may collect and process data that indicates a father's device has detected that he is with his daughter, at a location that is mapped to a beach town. Further, tracking the location may indicate that the father is walking with his daughter in a particular direction. The dialogue may be captured and analyzed to predict a mood and conversation topics; for example, laughter may be detected along with a discussion maybe about going to a concert. A concert in the park may be identified via public data as being a nearby event. As further information, the person's electronic calendar may include a notation of "Vacation" or "beach concert day."

From this data, the tracking application program 106 (possibly in conjunction with the meaningful event tracking server 110) may predict that the likelihood of a meaningful life event taking place is sufficiently high to satisfy defined meaningful event criteria. The meaningful event criteria can be predefined by default, learned/adjusted over time via user confirmation, and/or customized by a user. For example, unlike the above example of a father and daughter walking to a beach concert, a person who works at a concert venue may not consider heading to the venue or being at the venue as being a meaningful event. If a meaningful event is determined to satisfy the meaningful event criteria, the tracking application program 106 creates an entry in the meaningful event data store 220 (FIG. 2), e.g., a record in a database, such as "Walking to Beach Concert with Susie—Aug. 2, 2022."

The tracking application program 106 may present its prediction of the occurrence of a meaningful event to the user. For example, the tracking application program 106 may prompt the user in real-time as to whether he or she wants the system to capture available data and save the data collectively as a meaningful life event. This prompt may be presented via an onscreen alert, an audio alert (e.g., block 222 of FIG. 2), or by other means. The prompt may be presented in real-time or may be presented in a list along with other predicted meaningful events and replied to by the user later. A response from the user can be by voice, touch or key interaction with a user interface of the tracking application program 106, detected via gesture or other recognition (e.g., detection of a "thumbs-up" from the user). Note that if the prompt is not responded to in real time, the tracking application program 106 can (e.g., by default) capture and maintain the available sensor data until a confirmation decision is made by the user. The available data can be deleted if the user declares the event non-meaningful. As described herein, the tracking application program 106 or program connected thereto can learn from a user's confirmations and non-meaningful declarations over time as to what the user tends to consider meaningful versus non-meaningful, and, for example, adjust the meaningful event criteria (e.g., threshold values therein) based on what is learned.

In addition to or instead of a device-determined meaningful event, the user may self-declare the occurrence of a meaningful event; such an action automatically satisfies the meaningful event criteria. The user may send a command to the tracking application program 106, via device input, spoken command, or other input, to instruct the tracking application program 106 to collect data and save the data collectively as a record of the meaningful life event. The instruction may be to begin collection immediately, or retroactively, via a command such as "Save this event, starting 5 minutes ago" (as shown in example block 330 of FIG. 3), or "Save this event, starting from when we left the beach." The event is then created as an entry in the meaningful event data store, and to the extent retroactive data is available, (e.g., the device camera was on), the tracking application program 106 maintains such data in association with the event entry. Note that a user can request a retroactive collection of meaningful event from any time period, even a distant time, on the hope that some sensor data such as media content is saved and accessible to recreate the meaningful event. In this way a user who at the time did not consider an event meaningful can change his mind, as well as a user who at the time did not have the tracking application installed and running.

The user may schedule a future meaningful event that is expected to take place, such as self-declaring an upcoming wedding next weekend of a future meaningful event. Such meaningful event scheduling can be independent of any calendar data, or complement calendar data.

As set forth herein, upon detection of a meaningful life event, the tracking application program 106 may initiate the collection of data associated with the event. The tracking application program 106 may, for example, search via near-field, local, and wide area networks for other sources with sensor data that may provide data related to the event. This may include sensors/devices such as phones, cameras, microphones, and other devices that are tagged as being proximate to the location at the time indicated. For example, a traffic camera may provide publicly accessible data, and data from other cameras and/or microphones may be available free or for a fee. This may also include sensor data and other data recording devices that were proximate to the location at the time, e.g., a car's dashboard camera.

In this way, the tracking application program 106 and/or the meaningful event tracking server 110 may collect and store timestamped and location-stamped data that is descriptive of the environment of the event. For instance, wind speed and direction, air temperature, humidity, cloud cover and the like may be recorded. Presence of other people or mobile things may also be recorded, such as the make, model, year, and direction of a car passing by. This searching may be done at the time of the event, and also after the event has occurred, for instance to find data that was recorded in an accessible database after the event occurred.

Figure 3:
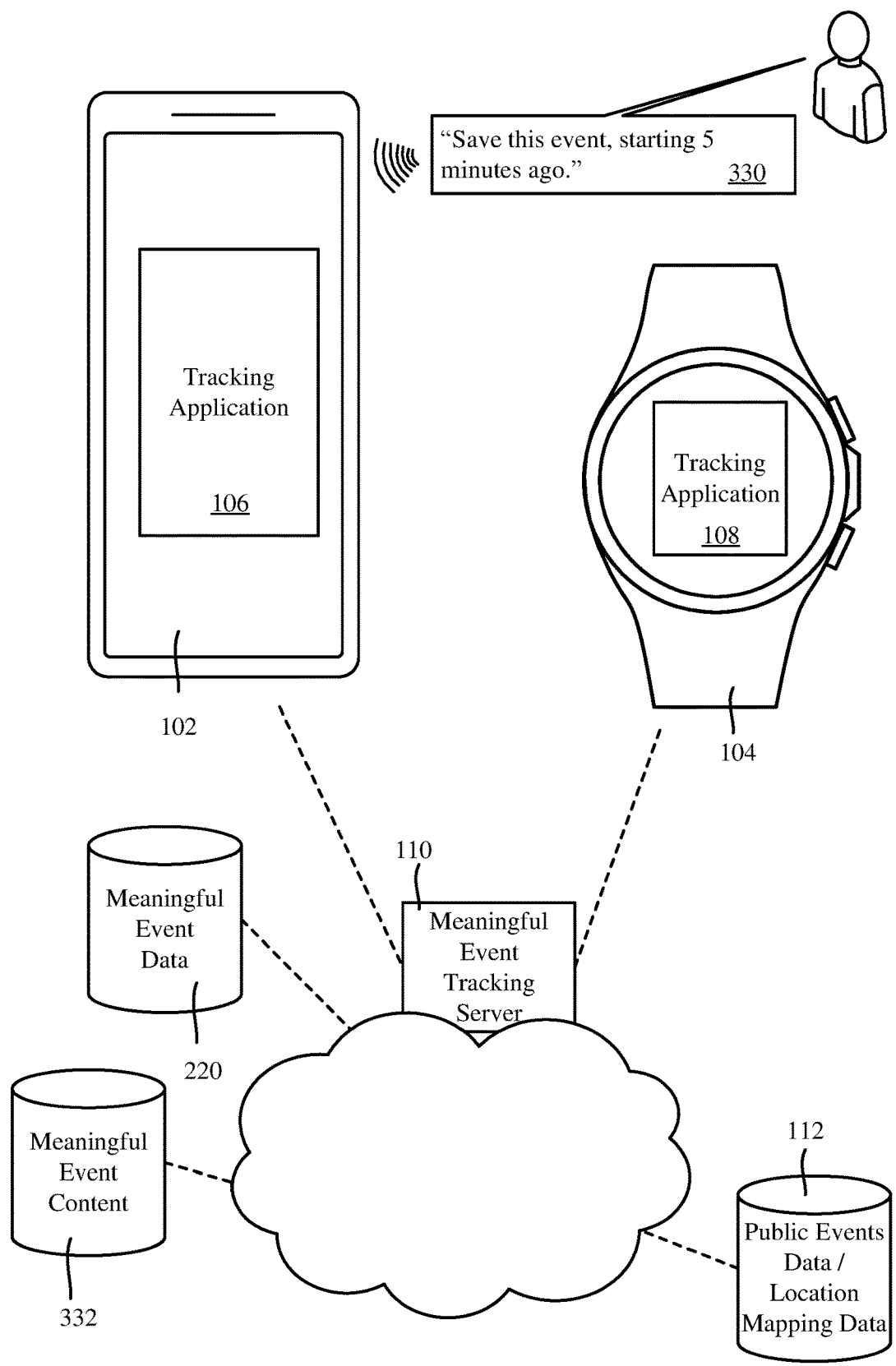
FIG. 3 is a block diagram representing an example system configured to collect data for a meaningful event, in accordance with various aspects and embodiments of the subject disclosure.

Using the found sources of content (image, video, audio, for example), the tracking application program 106 stores the timestamped and location-stamped content, e.g., in a meaningful event content data store (e.g., database 332, FIG. 3). This content may be processed by the tracking application program 106 or other software to identify specific data related to the content 332 that may be stored in the meaningful event database 220. For instance, the tracking application program 106 or another program (e.g., of another user) can determine that a specific song was playing nearby, or a volume level of traffic noise.

Figure 4:
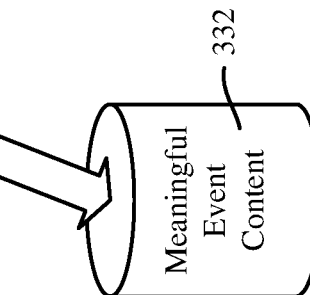
FIG. 4 is a representation of an example data structure that maintains information related to a meaningful event, in accordance with various aspects and embodiments of the subject disclosure.

As shown in an example data structure 440 of FIG. 4, in addition to the meaningful event description/title (field 442), the date/timestamp (field 443) and the collected non-media sensor data (field 444) and media sensor data (field 445), the collected meaningful event content may include metadata (field 445) that describes the content, such as location, camera orientation, and other metadata. A collection of meaningful event content related to a single event thus may be stored as a single meaningful event in the meaningful event content data store 332. Note that for any field the content data store may store a link to another data store that contains the actual data, such as cheaper cloud storage, inexpensive archived storage for meaningful events not accessed for a long time, and so on. Also, the example non-limiting record fields depicted in FIG. 4 can be broken up into a larger number of fields, while other fields may be combined into a lesser number of fields. Thus, for example, there can be a separate location field to facilitate faster searching.

With the meaningful event having been saved in a network-accessible data store 332 (database), as shown in FIG. 4, in a field 446 the user operationally may choose to save a user annotation, such as an audio and/or text recording of their thoughts at the time that the event data was captured. The user annotation (audio, text and/or transcribed speech), may be recorded using, for example, the tracking application program 106. The timestamp associated with the user speaking, typing, etc. the annotation may be analyzed to determine that the annotation is associated with the time window within which the meaningful event occurred. A user annotation can also be added, and/or modified at a later time, e.g., via the tracking application program 106 or a meaningful event editor component.

Additionally, as shown in the example data structure 440 of FIG. 4, in a field 447 the user may also use the tracking application program 106 or other user interface to the data to set one or more conditions for the meaningful event package of collected data, media, and user annotation data to be offered to the user or to another person to be available for presentation. Similarly, the meaningful event package may be sent for presentation using an application program associated with the user or another person. For instance, the meaningful event package may be sent for posting or distribution on a social media application used by the user, sent for access by a genealogy application, sent via email or text (which can be via a link to the data) and so on.

Conditional presentation of the meaningful event package is optional, and may be based on conditions such as those shown in FIG. 4 as examples; ("Send Meaningful Event to Susie on her 18th birthday, Send Meaningful Event to Susie if she is within 10 miles of this location, Send Meaningful Event to me in 20 years, Send Meaningful Event to me next time I visit my parents"). When the satisfaction of a condition results in the package or link thereto being sent to another party, a contacts address data store may be accessed in order to determine how to deliver the package/link to the person, however that person may receive such information in the future. An email or other message may be sent containing the package or a link to the package, and so on. For instance, if Susie is receiving messages via an augmented reality messaging service by the time she is 18, the meaningful event package may be delivered to her via the augmented reality messaging service. The meaningful event tracking server may have opt-in access to data associated with the user and any other people associated with the user in order to receive data that may be used to determine if any of the conditions are satisfied. In this way, when a condition for presentation of the meaningful event is satisfied, the user or another person may be presented with data and content (or access thereto) for the event to view.

In another embodiment, the user may create a conditional gifting situation associated with the presentation of the meaningful event package to another person. For example, the user may create a conditional gift such as shown in FIG. 4 (field 447), "Buy next meal for Susie if she is near location and without user." The conditional gift instructions may be saved in a manner similar to before, e.g., associated with the meaningful event. In this case, the meaningful event tracking server also may have access to a way by which to charge the user for the gift, and may also communicate the presentation of the gift to the other person. This also may be used for other applications, such as scavenger hunt games.

Figure 5:
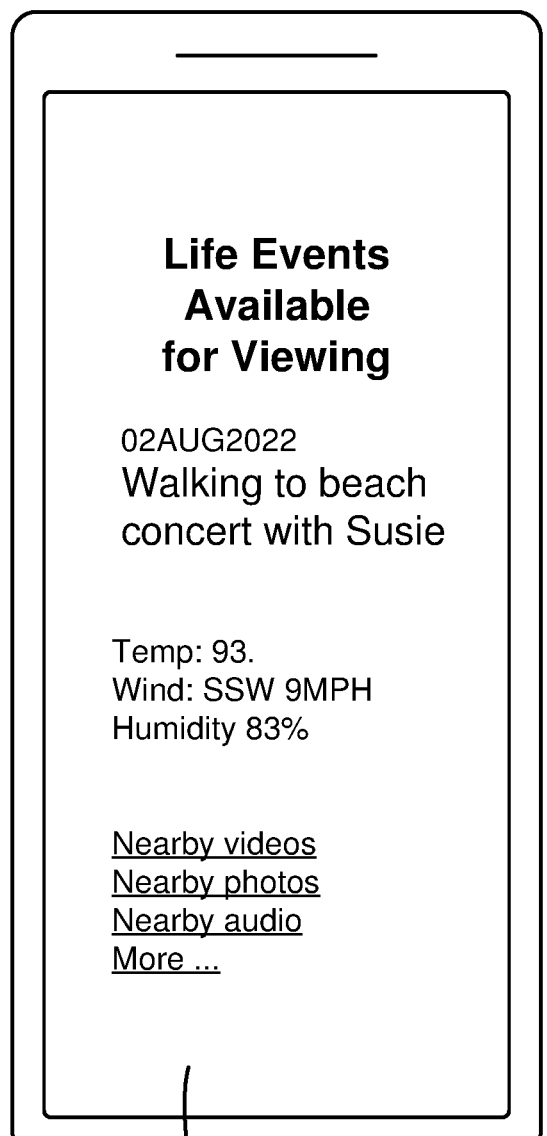
FIG. 5 is a representation of an example user interface by which a meaningful event presentation can be viewed, in accordance with various aspects and embodiments of the subject disclosure.

Turning to viewing meaningful events, when a condition for presentation of the meaningful event is satisfied, or the presentation of the meaningful event otherwise made available (e.g., via social media posting) the user or another person may be presented with data and content for the event to view. As represented in the interactive user interface 550 in FIG. 5, the presentation can describe/display the event, the time and date data, location if desired (not explicitly shown) and/or environmental condition data. In the example of FIG. 5, interactive elements can allow access to the captured video data (which can include audio data), photos, and captured audio data. If the user makes any of the other fields or related data available, in the example user interface 550 of FIG. 5, a "More" interactive element is shown, so that, for example the annotation data can be part of the presentation, information as to why the person is receiving the presentation: "You are receiving this because you are currently within 10 miles of this location" (according to the condition data), and/or the like.

Figure 6:
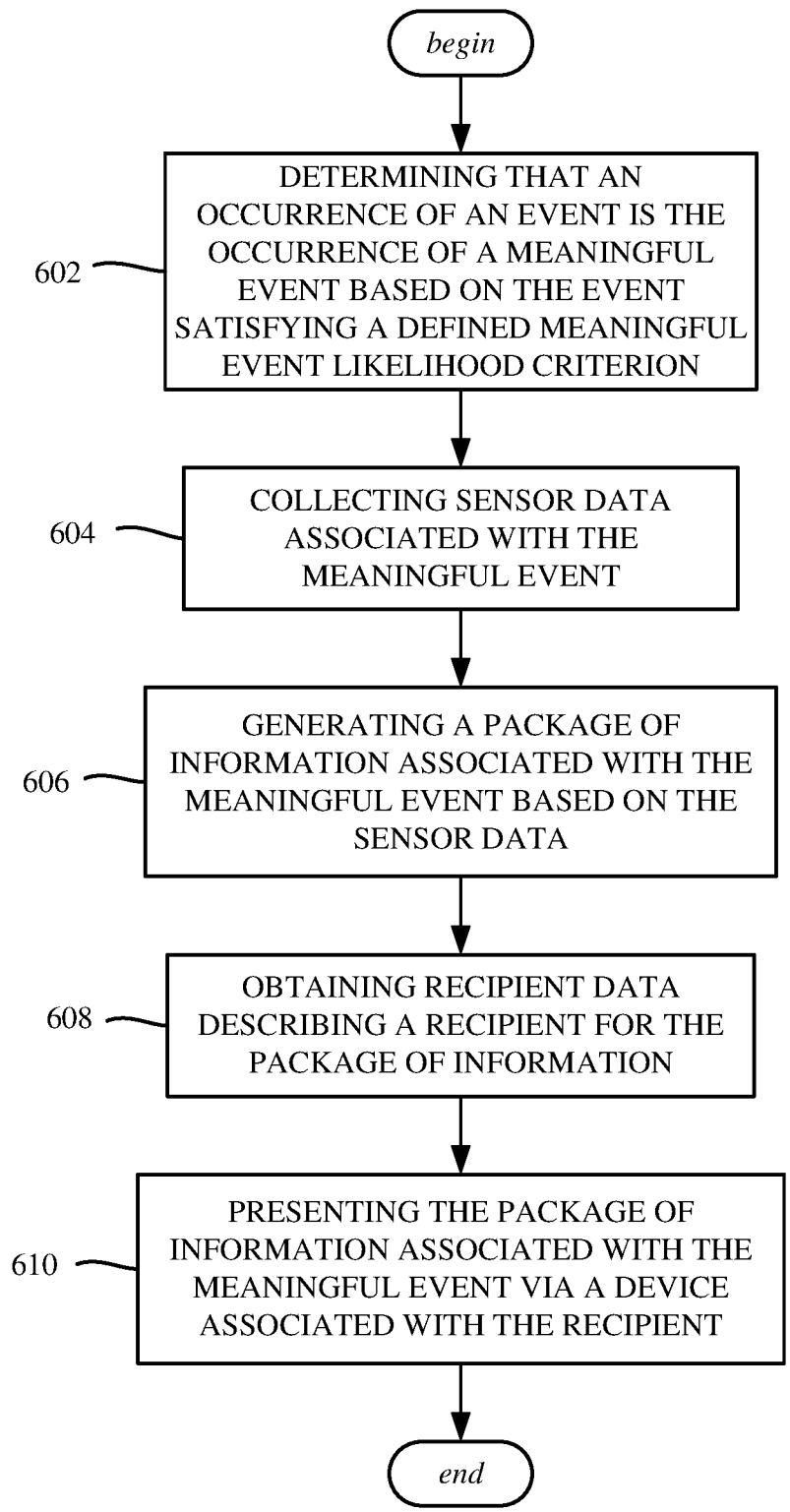
FIG. 6 is a flow diagram representing example operations related to detecting and presenting a meaningful event, in accordance with various aspects and embodiments of the subject disclosure.

One or more example aspects are represented in FIG. 6, and can correspond to a system, including a processor, and a memory that stores executable instructions that, when executed by the processor, facilitate performance of operations. Example operation 602 represents determining that an occurrence of an event is the occurrence of a meaningful event based on the event satisfying a defined meaningful event likelihood criterion. Operation 604 represents collecting sensor data associated with the meaningful event. Operation 606 represents generating a package of information associated with the meaningful event based on the sensor data. Operation 608 represents obtaining recipient data describing a recipient for the package of information. Operation 610 represents presenting the package of information associated with the meaningful event via a device associated with the recipient.

Collecting the sensor data associated with the meaningful event can include collecting media content.

Determining that the occurrence of the event is the occurrence of the meaningful event can include evaluating information in the sensor data that satisfies the defined meaningful event likelihood criterion.

Determining that the occurrence of the event is the occurrence of the meaningful event can include at least one of: receiving user input indicative of the occurrence of the meaningful event, determining that the meaningful event has previously occurred, or determining that the meaningful event is prescheduled.

Collecting the sensor data associated with the meaningful event can include collecting the sensor data from a first sensor of a user device and a second sensor external to the user device.

Further operations can include obtaining time data associated with the meaningful event, and collecting the sensor data associated with the meaningful event can include collecting at least one of location data, biometric sensor data, or environment data.

The device associated with the recipient can include at least one of: a social media application program, a messaging application program, or an email application program.

Further operations can include obtaining annotation data associated with the meaningful event, and incorporating the annotation data into the package of information.

Further operations can include receiving input data condition data describing a condition under which the package of information is to be presented, determining that the condition data has been satisfied, and wherein the presenting the package of information via the device associated with the recipient is in response to the determining that the condition data has been satisfied.

Further operations can include receiving input data comprising condition data describing a condition under which a gift is to be presented, determining that the condition data has been satisfied, and causing the gift to be presented in response to the determining that the condition data has been satisfied.

Figure 7:
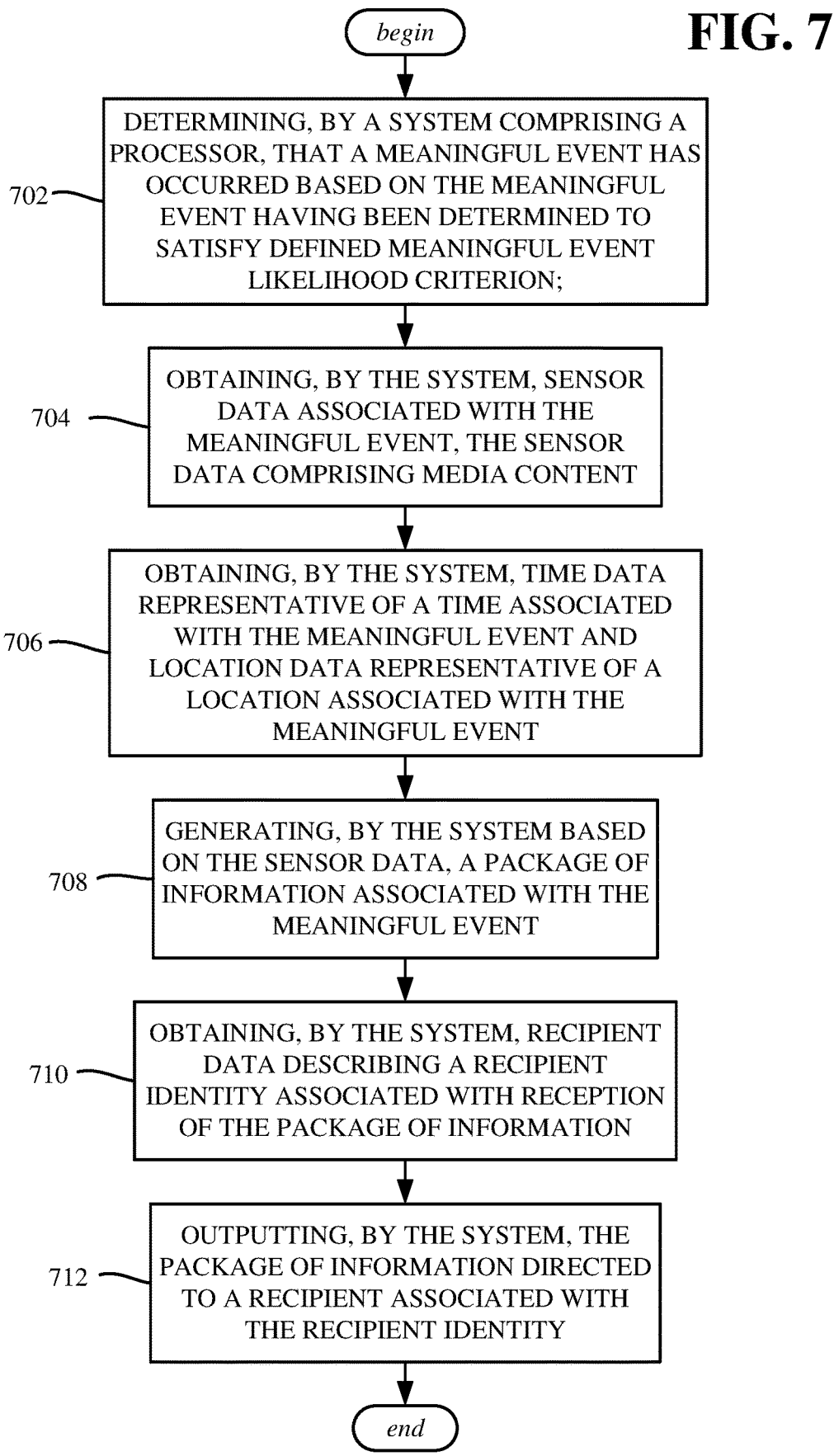
FIG. 7 is a flow diagram representing example operations related to determining occurrence of a meaningful event and outputting a package of information corresponding to the meaningful event, in accordance with various aspects and embodiments of the subject disclosure.

One or more example aspects are represented in FIG. 7, and, for example, can correspond to operations, such as of a method. Example operation 702 represents determining, by a system comprising a processor, that a meaningful event has occurred based on the meaningful event having been determined to satisfy defined meaningful event likelihood criterion. Operation 704 represents obtaining, by the system, sensor data associated with the meaningful event, the sensor data comprising media content. Operation 706 represents obtaining, by the system, time data representative of a time associated with the meaningful event and location data representative of a location associated with the meaningful event. Operation 708 represents generating, by the system based on the sensor data, a package of information associated with the meaningful event. Operation 710 represents obtaining, by the system, recipient data describing a recipient identity associated with reception of the package of information. Operation 712 represents outputting, by the system, the package of information directed to a recipient associated with the recipient identity.

Determining that the meaningful event has occurred can include at least one of: determining that sensor information in the sensor data satisfies the defined meaningful event likelihood criterion, receiving user input indicative of the occurrence of the meaningful event, determining that the meaningful event has previously occurred, or determining that the meaningful event was prescheduled.

Obtaining the sensor data associated with the meaningful event can include obtaining first sensor data collected from at least one of: a camera of a user device, a microphone of the user device, or user device location data of the user device, and obtaining second sensor data collected from a sensor external to the user device.

Obtaining the recipient data can include obtaining an address corresponding to an application program or a social media site.

Further operations can include obtaining, by the system, annotation data associated with the meaningful event, and incorporating the annotation data into the package.

Further operations can include receiving, by the system, input data comprising condition data representing a condition under which the package is to be output, determining that the condition represented by the condition data has been satisfied, and wherein outputting the package of information directed to the recipient is based on determining that the condition represented by the condition data has been satisfied.

Further operations can include receiving input data comprising condition data representing a condition for giving a gift based on the condition being satisfied, determining that the condition represented by the condition data has been satisfied, and in response to the determining that the condition represented by the condition data has been satisfied, causing the gift to be given.

Figure 8:
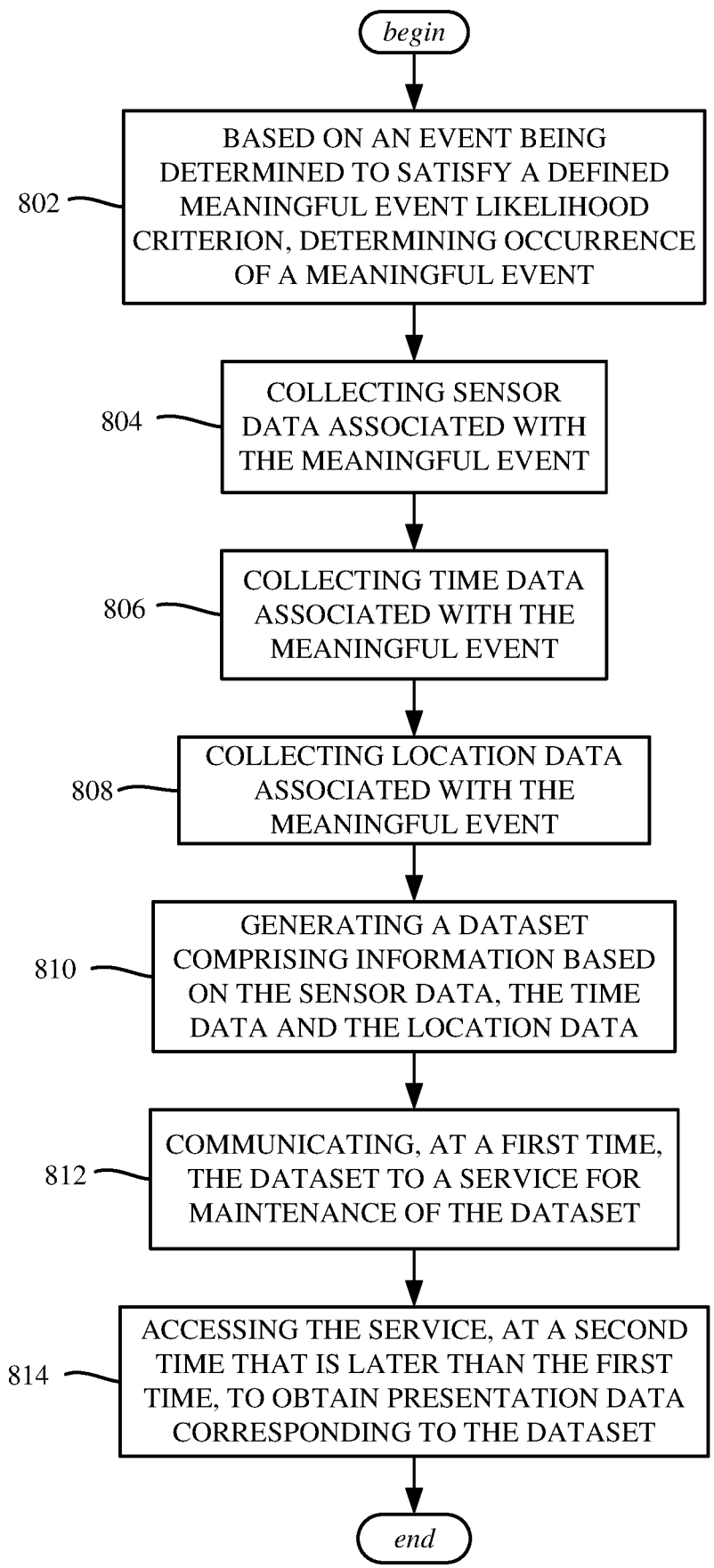
FIG. 8 is a flow diagram representing example operations related to determining occurrence of a meaningful event and collecting various data related to the meaningful event, in accordance with various aspects and embodiments of the subject disclosure.

One or more aspects are represented in FIG. 8, such as implemented in a machine-readable medium, including executable instructions that, when executed by a processor, facilitate performance of operations. Example operation 802 represents, based on an event being determined to satisfy a defined meaningful event likelihood criterion, determining occurrence of a meaningful event. Operation 804 represents collecting sensor data associated with the meaningful event. Operation 806 represents collecting time data associated with the meaningful event. Operation 808 represents collecting location data associated with the meaningful event. Operation 810 represents generating a dataset comprising information based on the sensor data, the time data and the location data. Operation 812 represents communicating, at a first time, the dataset to a service for maintenance of the dataset. Operation 814 represents accessing the service, at a second time that is later than the first time, to obtain presentation data corresponding to the dataset.

Determining the occurrence of the meaningful event can include at least one of: detecting proximity of a person that satisfies the defined meaningful event likelihood criterion, detecting presence at a current location associated with the meaningful event that satisfies the defined meaningful event likelihood criterion, detecting voice data that satisfies the defined meaningful event likelihood criterion, detecting public data that identifies an event that satisfies the defined meaningful event likelihood criterion, or detecting calendar data that satisfies the defined meaningful event likelihood criterion.

Further operations can include receiving input data describing condition data for a condition applicable to accessing the service to obtain the presentation data, determining that the condition represented by the condition data is satisfied, and wherein the accessing of the service occurs in response to the determining that the condition represented by the condition data is satisfied.

As can be seen, the technology described herein facilitates detection of a meaningful event and collection of sensor data (e.g., media content, environmental data and so on) and other data (e.g., time and location data, annotation data) related to the meaningful event. The collected data can be packaged or otherwise accessed for presentation. Conditional data can be used to set conditions for sending the packaged data or access thereto to a recipient program of a party, and/or giving a gift to a recipient party.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000, etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods, etc.

The MIMO technique uses a commonly known notation (M×N) to represent MIMO configuration in terms of number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 9:
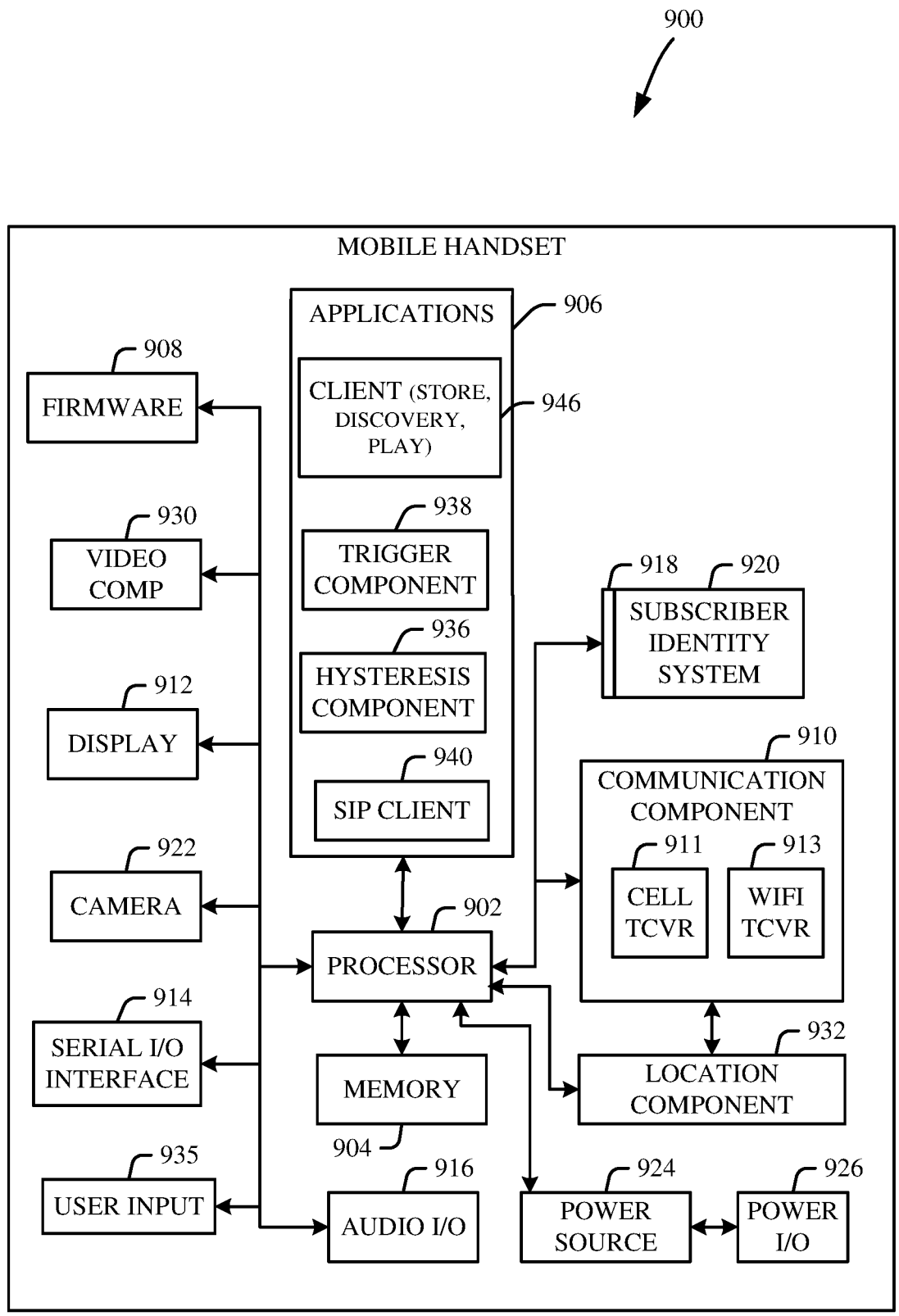
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct- wired connection, and wireless media such as acoustic, RF, infrared and other wireless media. Combinations of any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
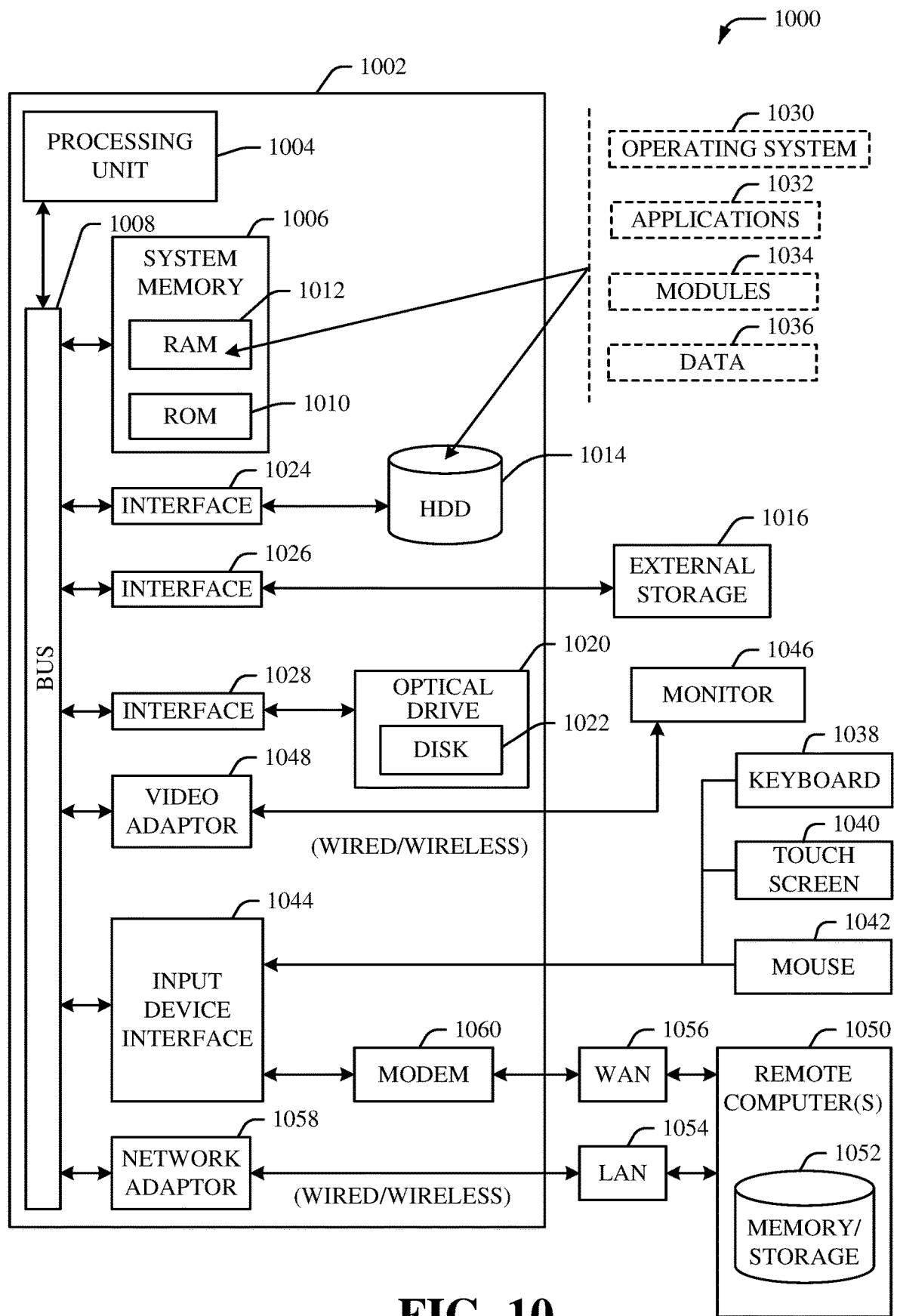
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external, and a wired or wireless device can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "IO BaseT" wired Ethernet networks used in many offices.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
    a processor; and
    a memory that stores executable instructions that, when executed by the processor of the system, facilitate performance of operations, the operations comprising:
        receiving input data comprising condition data describing a condition at a future time defined by a user under which a package of information is to be presented to a recipient;
        determining that an occurrence of an event is the occurrence of a meaningful event based on the event satisfying a defined meaningful event likelihood criterion;
        collecting sensor data associated with the meaningful event;
        generating the package of information associated with the meaningful event based on the sensor data;
        determining that the condition data has been satisfied;
        obtaining recipient data describing the recipient for the package of information; and
        presenting the package of information associated with the meaningful event via a device associated with the recipient, wherein the presenting the package of information via the device associated with the recipient is in response to the determining that the condition data has been satisfied.

2. The system of claim 1, wherein the collecting the sensor data associated with the meaningful event comprises collecting media content.

3. The system of claim 1, wherein the determining that the occurrence of the event is the occurrence of the meaningful event comprises evaluating information in the sensor data that satisfies the defined meaningful event likelihood criterion.

4. The system of claim 1, wherein the determining that the occurrence of the event is the occurrence of the meaningful event comprises at least one of: receiving user input indicative of the occurrence of the meaningful event, determining that the meaningful event has previously occurred, or determining that the meaningful event is prescheduled.

5. The system of claim 1, wherein the collecting the sensor data associated with the meaningful event comprises collecting the sensor data from a first sensor of a user device and a second sensor external to the user device.

6. The system of claim 1, wherein the operations further comprise obtaining time data associated with the meaningful event, and wherein the collecting the sensor data associated with the meaningful event comprises collecting at least one of: location data, biometric sensor data, or environment data.

7. The system of claim 1, wherein the device associated with the recipient comprises at least one of: a social media application program, a messaging application program, or an email application program.

8. The system of claim 1, wherein the operations further comprise obtaining annotation data associated with the meaningful event, and incorporating the annotation data into the package of information.

9. The system of claim 1, wherein the operations further comprise receiving second input data comprising second condition data describing a second condition under which a gift is to be presented, determining that the second condition data has been satisfied, and causing the gift to be presented in response to the determining that the second condition data has been satisfied.

10. The system of claim 5, wherein the first sensor comprises at least one of: a camera of the user device, a microphone of the user device, or user device location data of the user device.

11. A method, comprising:
receiving, by a system comprising a processor, input data comprising condition data describing a condition at a future time defined by a user under which a package of information is to be output to a recipient
determining, by the system, that a meaningful event has occurred based on the meaningful event having been determined to satisfy a defined meaningful event likelihood criterion;
obtaining, by the system, sensor data associated with the meaningful event, the sensor data comprising media content;
obtaining, by the system, time data representative of a time associated with the meaningful event and location data representative of a location associated with the meaningful event;
generating, by the system based on the sensor data, the package of information associated with the meaningful event;
determining, by the system, that the condition data has been satisfied;
obtaining, by the system, recipient data describing the recipient associated with reception of the package of information; and
outputting, by the system, the package of information directed to the recipient, wherein the outputting of the package of information is in response to the determining that the condition data has been satisfied.

12. The method of claim 11, wherein the determining that the meaningful event has occurred comprises at least one of: determining that sensor information in the sensor data satisfies the defined meaningful event likelihood criterion, receiving user input indicative of the occurrence of the meaningful event, determining that the meaningful event has previously occurred, or determining that the meaningful event was prescheduled.

13. The method of claim 11, wherein the obtaining the sensor data associated with the meaningful event comprises obtaining first sensor data collected from at least one of: a camera of a user device, a microphone of the user device, or user device location data of the user device, and
obtaining second sensor data collected from a sensor external to the user device.

14. The method of claim 11, wherein the obtaining the recipient data comprises obtaining an address corresponding to an application program or a social media site.

15. The method of claim 11, further comprising obtaining, by the system, annotation data associated with the meaningful event, and incorporating the annotation data into the package of information.

16. The method of claim 11, further comprising receiving second input data comprising second condition data representing a second condition for giving a gift based on the second condition being satisfied, determining that the second condition represented by the second condition data has been satisfied, and in response to the determining that the second condition represented by the second condition data has been satisfied, causing the gift to be given.

17. A non-transitory machine-readable medium, comprising executable instructions that, when executed by a processor, facilitate performance of operations, the operations comprising:
receiving input data describing condition data for a condition at a future time defined by a user applicable to accessing a service to obtain presentation data;
based on an event being determined to satisfy a defined meaningful event likelihood criterion, determining an occurrence of a meaningful event;
collecting sensor data associated with the meaningful event;
collecting time data associated with the meaningful event;
collecting location data associated with the meaningful event;
generating a dataset comprising information based on the sensor data, the time data and the location data;
determining that the condition represented by the condition data is satisfied;
communicating, at a first time, the dataset to the service for maintenance of the dataset; and
accessing the service, at a second time that is later than the first time, to obtain the presentation data corresponding to the dataset, wherein the accessing of the service occurs in response to the determining that the condition represented by the condition data is satisfied.

18. The non-transitory machine-readable medium of claim 17, wherein the determining the occurrence of the meaningful event comprises at least one of: detecting a proximity of a person that satisfies the defined meaningful event likelihood criterion, detecting a presence at a current location associated with the meaningful event that satisfies the defined meaningful event likelihood criterion, detecting voice data that satisfies the defined meaningful event likelihood criterion, detecting public data that identifies an event that satisfies the defined meaningful event likelihood criterion, or detecting calendar data that satisfies the defined meaningful event likelihood criterion.

19. The non-transitory machine-readable medium of claim 17, wherein the collecting the sensor data associated with the meaningful event comprises collecting media content.

20. The non-transitory machine-readable medium of claim 17, wherein the determining the occurrence of the meaningful event comprises evaluating information in the sensor data that satisfies the defined meaningful event likelihood criterion.

* * * * *